UNITED STATES PATENT OFFICE.

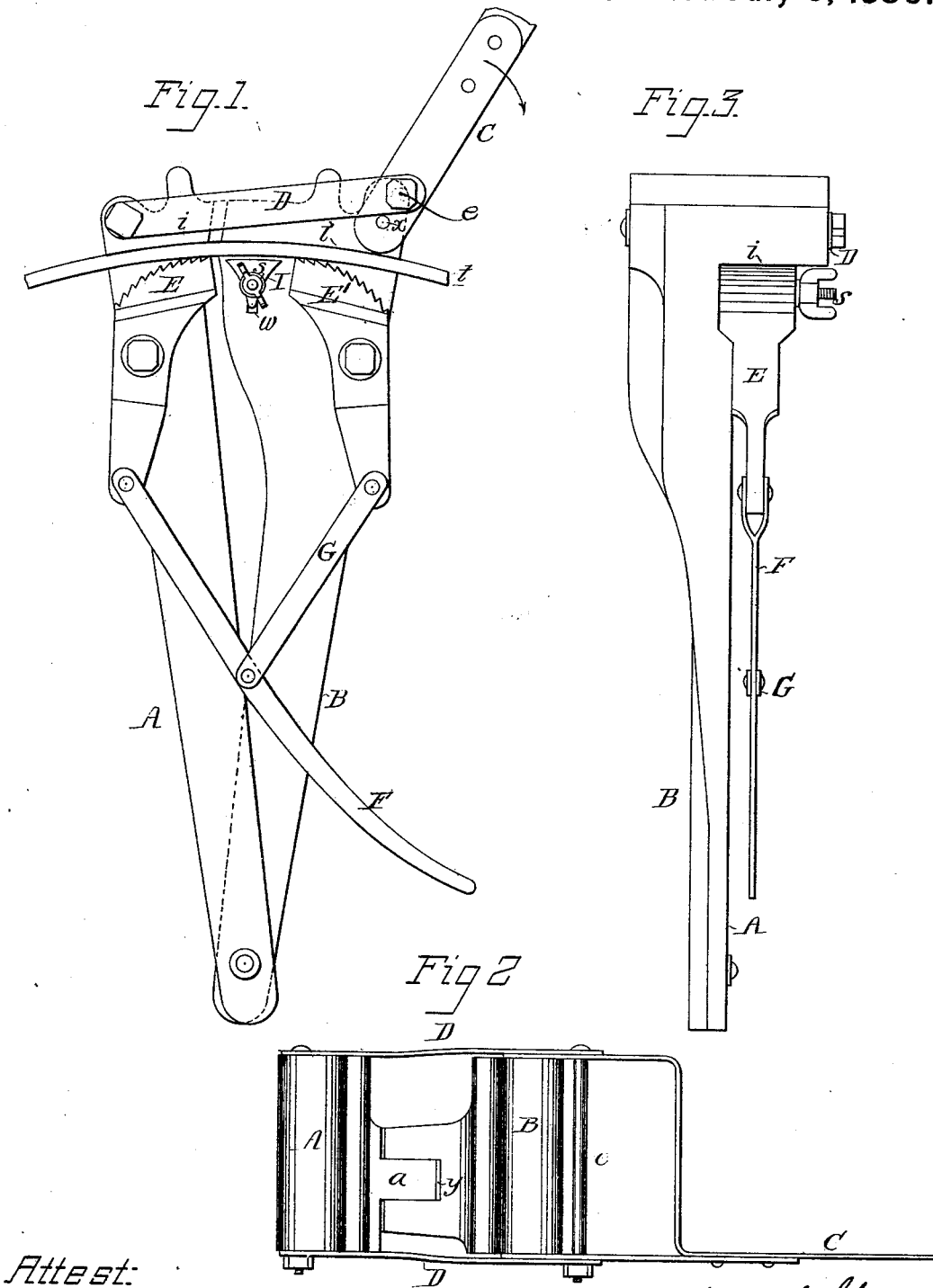

ALBERT H. STRUPPLER, OF HERRICKVILLE, PENNSYLVANIA.

TIRE-UPSETTER.

SPECIFICATION forming part of Letters Patent No. 229,647, dated July 6, 1880.

Application filed January 27, 1880.

*To all whom it may concern:*

Be it known that I, ALBERT H. STRUPPLER, of Herrickville, Bradford county, State of Pennsylvania, have invented an Improvement in Machines for Upsetting Tires, &c., of which the following is a specification.

My invention is an improved device for upsetting tires or other articles of metal, constructed as fully described hereinafter, to facilitate the griping or releasing of the metal, prevent buckling, and apply the requisite pressure with comparatively little exertion by the operator. These objects I effect by the means illustrated in the accompanying drawings, forming part of this specification, in which—

Figure 1 is a side view of the device; Fig. 2, an end view, and Fig. 3 an edge view.

The device consists, essentially, of two arms, A B, pivoted together near one end, a lever, C, pivoted at $x$ to the arm B, and connected by bars D D to the arm A, and clamps E E', pivoted to the sides of the arms A B, with their upper serrated ends below shoulders $i$ of said arms.

A tongue, $a$, of the arm A extends into a recess, $y$, in the arm B, to prevent lateral movement of one arm independent of the other.

The bars D D are pivoted to the lever C by a rod, $e$, at some distance beyond the pivot $x$, forming a toggle-joint, so that the arms may be brought together or separated by swinging the lever C.

The jaws E E' are so pivoted and so shaped at the upper edges that they will automatically gripe the tire or other bar, $t$, against the shoulders $i$ when the lever C is turned in the direction of its arrow, so as to bring the jaws together, that portion of the metal between the jaws being thus upset or shortened. To prevent the metal from bending downward during this operation a block, I, is secured to the arm B, so as to extend under the bar $t$ between the jaws, and this block may be secured by a bolt, $s$, which is adjustable in a slot, $w$, to adapt the device to tires or bars of greater or less thickness.

To enable the operator to control the jaws E E', a lever, F, is pivoted to the jaw E, and a connecting-rod, G, is pivoted to the lever and to the jaw E'.

It is important that the attendant be able to manage both the gripers and the compressing devices simultaneously, so that after griping the tire he can at once compress it, and so that after compressing he can retain the tire by one or other griper, open the arms, thus carrying the tire partly round, again gripe and compress it.

This can be done by the above machine, the attendant standing at one side, grasping one lever with one hand, the other with the other, all operations being performed and the tire carried round in either direction without the attendant removing his hands from the levers.

I am aware that the separate elements of this machine are all old, and that they are all found in tire-upsetting machines; but

I claim as an improvement and of my invention—

The combination, with the device by and through which the upsetting force is applied, of the device for clamping the tire, the latter consisting of the serrated jaws E E', lever F, and link G, the several parts being articulated to one another, and the two devices likewise being articulated to one another, as described.

In testimony whereof I have signed my name to this specification in the presence of two subscribing witnesses.

A. H. STRUPPLER.

Witnesses:
J. J. ANDERSON,
B. W. TITUS.